March 28, 1967 H. L. REES 3,311,862
BONDED LOW-TEMPERATURE LAMINATED RESISTANCE HEATER
Filed Sept. 9, 1964
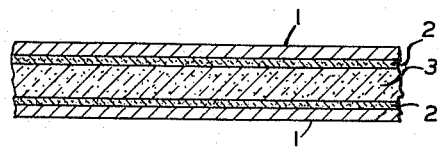
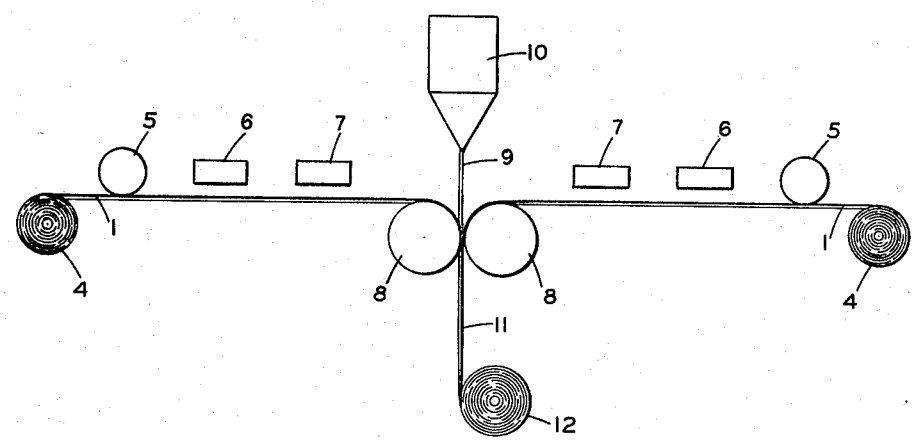
INVENTOR
HERBERT L. REES
BY *Theodore L. Thomas*
ATTORNEY 3,311,862
BONDED LOW-TEMPERATURE LAMINATED
RESISTANCE HEATER
Herbert L. Rees, Lancaster County, Pa.
(1544 Lambeth Road, Lancaster, Pa. 17601)
Filed Sept. 9, 1964, Ser. No. 395,168
4 Claims. (Cl. 338—211)

This invention relates generally to resistance heaters, and more particularly to a low-temperature laminated resistance heater. Still more particularly, the invention relates to a resistance heater wherein the metallic electrodes are strongly affixed to the resistance element by means of an intermediate coating.

Laminated resistance heaters are described in copending application Ser. No. 307,038, filed Sept. 6, 1963, now U.S. Patent No. 3,221,145. That application describes preferred methods of making large-area sheet heaters in which metallic foil electrodes are separated by a semi-insulating layer. Heat is generated by the passage of electrical current from one opposing sheet electrode to another through the semi-insulating layer. These heaters are generally flexible heaters particularly suitable for heating large areas. The heaters may be adapted to high or low temperature, and the semi-insulating layer may be any material meeting the defined properties of resistivity, thickness, and the like.

Where low-temperature heaters are desired, particularly where flexibility is to be maintained during the life of the heater, it has been found that after extended operation the bond between the electrode and the semi-insulating layer may begin to fail. Such failure drastically changes the electrical characteristics of the laminated heater, particularly where the failure is in the region of the power input. The bond between the foil electrodes and the semi-insulating layer is particularly difficult to maintain when the heater is periodically flexed during operation. At the same time, changing the composition to improve the bond strength has resulted in a composition that does not remain electrically stable for extended periods. It is desirable therefore that a low-temperature heater capable of operating in the temperature range of 80°–250° F. be designed, one which may be flexed or otherwise treated roughly during use without separation or delamination of the electrodes and the semi-insulating layer, and one in which the semi-insulating layer will remain substantially unchanged electrically.

It is the primary object of the present invention to present such a heater. It is a further object of the present invention to present a low-temperature resistance heater which will withstand a wide range of temperatures in the low-temperature range while simultaneously undergoing physical abuse.

These objects have now been achieved in a strikingly effective manner. The invention contemplates a low-temperature laminated resistance heater comprising metallic foil electrodes separated by a semi-insulating layer, each electrode having an electrically conductive key coat on the face adjacent the semi-insulating layer. The key coat comprises an electrically conductive carbon, plasticizer, and a resinous binder containing 25–75% by weight of a polymeric vinyl chloride-vinyl acetate copolymer and 75–25% by weight of a polymeric vinyl chloride-vinyl alcohol copolymer. The semi-insulating layer comprises a plasticized poly(vinyl chloride) containing sufficient electrically conductive carbon to impart a resistivity in the range of about $4 \times 10^3$ to $4 \times 10^7$ ohm-inches.

The flexible metallic foil electrodes used in the present invention may be any of the suitable metallic foils possessing a thickness in the range of about 0.0001–0.01 inch which are good electrical conductors. Metal foils of aluminum, copper, various alloys, stainless steel, other steel alloys, and the like may be used. Copper foil having a thickness in the range of 0.0005–0.002 inch is preferred in view of its attractive cost, low heat capacity per unit area, excellent electrical properties, and easy workability. However where inertness or extra strength is required in the laminated heater of the present invention, a stainless steel foil will be preferred.

The two or more metallic foil electrodes will be separated by a semi-insulating layer. This semi-insulating layer is normally bonded or fused to the electrodes in order to form good electrical contacts. However, the gist of the present invention is that it is difficult to bond conductive resinous films to metallic foils and to maintain that bond under the conditions that exist during heater use. Tinkering with the composition to improve the bond strength has resulted only in destroying the electrical stability of the films. Accordingly, the bonding problem is solved by the present invention by supplying an intermediate coating between the metallic foil electrode and the semi-insulating layer itself. This intermediate coating is referred to herein as the key coat. The key coat has the property of very strongly adhering to the metallic foil on one side, while also adhering very strongly to the semi-insulating layer on the other side. To achieve this highly desirable result, the composition of both the key coat and the semi-insulating layer must be rigorously controlled.

The key coat composition must contain a blend of resinous copolymers as a binder for the key coat. These two copolymers are selected in order that one will bond strongly to the foil while the other will bond strongly to the semi-insulating layer, to be described below. The two copolymers involved are vinyl chloride-vinyl acetate copolymers, and vinyl chloride-vinyl alcohol copolymers. As to the vinyl chloride-vinyl acetate copolymers, those containing the higher amounts of vinyl acetate are preferred. Such copolymers will generally run 8–13% by weight vinyl acetate copolymerized with the vinyl chloride. Additionally, these copolymers may contain small amounts of additional copolymerized ingredients such as maleic acid. A particularly effective copolymer contains about 86% by weight vinyl chloride, about 13% by weight vinyl acetate, and about 1% by weight maleic acid.

The vinyl chloride-vinyl alcohol copolymer will generally contain 2–20% by weight vinyl alcohol, one preferred embodiment containing about 95% by weight vinyl chloride and about 5% by weight vinyl alcohol.

Both of these types of copolymers are readily available on the market. They are solution-type resinous copolymers.

The binder of the key coat, as was pointed out earlier, will contain 25–75% by weight of the vinyl chloride-vinyl acetate copolymer, and correspondingly, 75–25% by weight of the vinyl chloride-vinyl alcohol copolymer, preferably about half of each. The mixture of these two resins comprises the binder system of the key coat. The balance of the key coat composition will include a conductive carbon which may be in the form of a graphite. Many electrically conductive carbon blacks and graphites are available on the market, for example Great Lakes artificial graphite or acetylene black. The electrically conductive material will be used in the form of very finely divided particles, at least over 95% through 200 mesh, U.S. Standard. The amount of electrically conductive carbon particles to be used will be such that the electrical resistance of the key coat will be exceedingly low, far below that of the semi-insulating layer. In fact, the key coat may be stated to be an electrical conductor. The amount of electrically conductive carbon necessary to render the composition a conductor will generally vary in the range of about 5–85% by weight based on the amount of binder.

Since the binder of the key coat composition is made up of a copolymeric mixture, it is desirable that the binder be plasticized in order to maintain food flexibility. The normal and usual plasticizers may be used such as dioctyl phthalate, dicresyl phosphate, polyester plasticizers, epoxidized vegetable oils, and the like. The amount of plasticizer will be that normally used in such compositions and will generally range from about 5% by weight to 90% by weight of the resinous binder. Although it has not been found necessary in practice to incorporate stabilizers or lubricants with the key coat, such may be used if desired.

The best way of applying the key coat composition to the metallic foil is in the form of a solution. Accordingly, the resins, carbon, and plasticizer should be taken up in a solvent or solvent mixture suitable for spreading the key coat over the metallic foil. The usual solvents normally used in preparing polymeric solutions of these polymers will be used. The ketones, the hydrocarbons, both aliphatic and aromatic, are preferred. Usually mixtures of individual solvents will be utilized in order to control the evaporation rate of the solvent system from the film and to aid in ready dissolving of the binder. A preferred solvent system will be a mixture of at least one ketone and at least one hydrocarbon. The amount of solvent or solvent system to be used will depend on the viscosity desired which in turn will relate to the method of applying the key coat to the metallic foil. The solids content will usually be below 50%, generally in the range of about 20–40% by weight solids.

The key coat composition is readily prepared by dispersing the resins in the solvent along with the electrically conductive carbon, preferably after dispersal of the carbon in the plasticizer. Simple mixing and dissolving is all that is required here.

In applying the key coat, any convenient method of application may be used. The key coat may be roller coated, brushed, squeegeed, or otherwise applied to the entire surface of the metallic foil which is to be used in the formation of a laminated resistance heater. The coat may be as thin as may conveniently be applied, provided it is a good electrical conductor throughout its thickness. Thicknesses of one mil or less, and preferably about ½ mil after drying are preferred. Once the vinyl solution has been applied, drying by any convenient means will place the key coat film in condition for assembly with the semi-insulating layer.

The semi-insulating layer has a poly(vinyl chloride) binder. This poly(vinyl chloride) is generally known as general purpose poly(vinyl chloride). It serves as an excellent binder to hold the requisite amount of electrically conductive carbon particles needed to give the semi-insulating layer the resistivity defined earlier. Additionally, the poly(vinyl chloride) will be plasticized with the usual amounts of the usual plasticizers, generally ranging from 15 to 60 parts by weight plasticizer per 100 parts of the resin. The amount of conductive black to be added will depend to some extent on the electrical characteristics of the black and on the exact resistivity desired in the semi-insulating layer. The desired resistivity will be produced by an amount of a conductive carbon in the range of about 10–80 parts by weight per 100 parts by weight of the resin.

In addition to the electrically conductive carbon as defined earlier, the semi-insulating layer will generally include those stabilizers normally used with vinyl chloride resins, such as the barium-cadmium phosphite stabilizers, polyol stabilizers, epoxidized vegetable oil stabilizers, and any of the other systems. Lubricants such as stearic acid may desirably be added, particularly where the semi-insulating layer is to be prepared in the form of an extruded film. Stabilizers and lubricants will be used in known amounts in the composition.

In actually making the composition, the resins may be mixed with the other ingredients, preferably in an intensive mixer such as a Banbury. Mixing may be followed by milling and sheeting out. Cooling of the sheet then allows dicing, and the diced semi-insulating composition may be fed to an extruder which will then produce a film of any desired width or length and having the requisite thickness to achieve the necessary resistivity. Since one of the advantages of the resistance heaters of the present invention is their thinness, great flexibility, and low heat capacity, the film which makes up the semi-insulating layer as described should preferably have a thickness in the range of about 5–25 mils, with 10 mils being a preferred thickness.

The extruded film may be assembled or laminated in known manner between metallic foil electrodes which have been coated with the key coat on those surfaces which will be in contact with the semi-insulating layer. The key coat is preferably softened by preheating just prior to laminating the coated electrodes and the semi-insulating layer. If a three-electrode resistance heater is desired, the center electrode which will be sandwiched between two layers of semi-insulating material will be coated on both sides with the key coat described above. A three-electrode heater may be prepared utilizing one semi-insulating layer, and an electrically insulating layer. In such an arrangement, the center electrode may be the power electrode and current will flow from it to the two outer electrodes, either or both of which may be grounded.

The invention will be better understood with reference to the following drawings in which FIG. 1 shows a simplified sectional view of a laminated heater of the present invention, and FIG. 2 shows a simplified flow diagram of a method of making the heater of the present invention.

Referring to FIG. 1, the metal foil electrodes 1 carry the resinous key coats 2 on their inner surfaces in contact with the semi-insulating layer 3. As emphasized earlier, the resinous key coats 2 are very good electrical conductors compared with the semi-insulating layer in order that no heat will be generated in the key coats.

In FIG. 2, the metallic foils 1 are removed from the windup rolls 4 and then pass beneath suitable coating devices such as roll coaters 5 which apply the key coats. The solvents are removed from the key coats by the dryers 6. Just prior to laminating, the key coats are softened by exposure to heat at the heaters 7. Although the feature is not shown in FIG. 2, the key coated electrode foils may be rolled and stored in the operation between the dryers 6 and the heaters 7.

In any case, the foils bearing the softened key coats pass to the laminating rolls 8. The semi-insulating layer in the form of a film 9 passes from the extruder 10 to the laminating rolls 8 between the coated metal foils 1. The laminating rolls 8 are adapted to supply sufficient heat and pressure to form a strong bond in the system. After passing out of the laminating rolls 8, the laminated product 11 may pass to a windup roll 12 for storage, shipment, or sale.

The following example illustrates an embodiment of the invention. All parts are by weight unless otherwise stated.

*Example*

The following key coat formulation was prepared:

| Ingredients | Parts | Usable Range, Parts |
|---|---|---|
| Vinyl chloride-vinyl acetate, 1% maleic acid (VMCH) | 40 | 20–60 |
| Vinyl chloride-vinyl alcohol copolymer (VAGH) | 40 | 20–60 |
| Conductive carbon (Conductex S.C.) | 40 | 5–100 |
| Dioctyl phthalate | 40 | 5–60 |
| Methyl isobutyl ketone | 80 | |
| Xylol | 80 | |
| Naphtha | 80 | |

The key coat was prepared by dispersing the resins in the solvents. The carbon was dispersed in the dioctyl phthalate which was then added to the resin solution.

This key coat was applied to copper foil having a thickness of 0.0008 inch by reverse roller coating. The key coat was dried to a nontacky state having a thickness of ½ mil. Prior to laminating, the key coat was softened by heating.

A semi-insulating layer having the following formula was prepared:

| Ingredients | Parts | Usable Range, Parts |
|---|---|---|
| Poly(vinyl chloride) (Opalon 630) | 100 | 100 |
| Dioctyl phthalate | 35 | 15–60 |
| Epoxidized soybean oil | 4.4 | 2–10 |
| Barium-cadmium phosphite stabilizer | 4.0 | 2–10 |
| Stearic acid | 0.2 | 0–1 |
| Conductive carbon | 32.5 | 15–80 |

In making the semi-insulating layer composition, the resins were placed in a Banbury and the other ingredients were added. After thorough mixing, the composition was dropped to a mill and sheeted out and cooled. The sheet was diced into pellets which were then placed in an extruder and extruded into a 10 mil thick film. This film was passed directly between two webs of preheated key coated copper foil as described above between laminating rolls to form the finished laminated heater.

I claim:

1. A low-temperature laminated resistance heater comprising metallic foil electrodes separated by a semi-insulating layer, each electrode having an electrically conductive key coat on the face adjacent the semi-insulating layer, the key coat comprising an electrically conductive carbon, plasticizer, and a resinous binder containing 25–75% by weight of a polymeric vinyl chloride-vinyl acetate copolymer and 75–25% by weight of a polymeric vinyl chloride-vinyl alcohol copolymer, said semi-insulating layer comprising a plasticized poly(vinyl chloride) containing sufficient electrically conductive carbon to impart a resistivity in the range of about $4 \times 10^3$ to $4 \times 10^7$ ohm-inches.

2. A resistance heater according to claim 1 wherein said foil electrodes comprise copper electrodes.

3. A resistance heater according to claim 1 wherein said foil electrodes comprise stainless steel electrodes.

4. A resistance heater according to claim 1 wherein said key coat contains equal parts by weight of the vinyl chloride-vinyl acetate copolymer and the vinyl chloride-vinyl alcohol copolymer.

References Cited by the Examiner

UNITED STATES PATENTS

| | | | |
|---|---|---|---|
| 2,952,761 | 9/1960 | Smith-Johannsen | 219—544 X |
| 2,982,934 | 5/1961 | Browne | 338—323 |
| 3,061,501 | 10/1962 | Dittman et al. | 156—250 |
| 3,221,145 | 11/1965 | Hager | 219—549 |

RICHARD M. WOOD, *Primary Examiner.*

V. Y. MAYEWSKY, *Assistant Examiner.*